UNITED STATES PATENT OFFICE.

JOHN A. DITCH, OF CHICAGO, ILLINOIS.

COMPOSITION FOR BLACKBOARD WALLS.

SPECIFICATION forming part of Letters Patent No. 339,155, dated April 6, 1886.

Application filed November 24, 1884. Serial No. 148,754. (No specimens.)

*To all whom it may concern:*

Be it known that I, JOHN A. DITCH, residing at Chicago, in the county of Cook and State of Illinois, and a citizen of the United States, have invented a new and useful Improvement in Compositions for Blackboard Walls, of which the following is a full description.

The object of my invention is to furnish a composition which in its plastic condition can be used in forming the main body of the plastering on the wall of a school-building or recitation-room, which will furnish a substitute for a blackboard, and also of the whole or a part of the body of the plastering of the wall as far as it may be used; and its nature consists in combining the material used, as hereinafter specified and claimed as new.

In preparing my composition I first take pulverized or ground slate and silica or fine sand and mix them in equal proportions. I then add plaster-of-paris to this mixture, in quantity about equal to one-third thereof, and then stir them together and mix them with water in sufficient quantity to make a plastic mass, which is suitable to be applied to the wall by the use of ordinary plasterers' tools. This composition may be applied to the full depth of the wall, or as a finishing coat over an ordinary first coat of plastering, according to the desired depth of the composition.

This composition hardens readily, and when properly applied presents a smooth even surface to the eye, and produces a surface which will cut the chalk or crayon, so as to produce clear, plain, and legible marks.

The proportions stated are those which I deem best; but it is evident that they may be somewhat varied without injuring the composition, and no great care is required in determining the proportions, and for coarser or poorer grades ordinary quicklime may be used instead of plaster-of-paris, and it may be used for the first coat and plaster-of-paris for the finishing coat when the composition is to be used for the entire depth of the plastering.

It will be understood that coloring-matter may be used to give the finished work such color as may be desired, and that by the use of different coloring-matters various colors or shades may be produced.

By the use of this composition I make a surface upon which marks can be made, which is durable, and which does not deteriorate by use, as ordinary blackboard-coatings do, by being worn through, as by the use of this composition a depth equal to the entire depth of the plaster wall may be cheaply made, and its character or color will not be changed until the wall is worn entirely through, which is not likely to occur.

What I claim as new, and desire to secure by Letters Patent, is—

The composition herein described for making blackboard walls, consisting of powdered slate, silica, and plaster-of-paris, mixed and applied substantially as set forth.

JOHN A. DITCH.

Witnesses:
M. L. PRICE,
L. L. BOND.